United States Patent Office 3,574,538
Patented Apr. 13, 1971

3,574,538
PROCESS FOR PREPARING HIGH SILICA FAUJASITE
Carl Vance McDaniel, Laurel, Md., and Heyman Clarke Duecker, Marion, Ind., assignors to W. R. Grace & Co., New York, N.Y.
No Drawing. Filed Oct. 17, 1968, Ser. No. 768,508
Int. Cl. C01b 33/28
U.S. Cl. 23—112                                 5 Claims

ABSTRACT OF THE DISCLOSURE

A process for preparing faujasite having a silica-alumina ratio above about 4.5 by treating a mixture of clay, alkali metal hydroxide, alkali metal silicate, and nucleation centers (zeolite seeds) and heating to convert to the zeolite desired. The initial reactant mixture may be prepared to have a composition equal to or near that of the desired product.

---

The present invention relates to the production of crystalline alumino-silicates commonly referred to as molecular sieves. More specifically, this invention relates to the preparation of faujasite materials having a silica to alumina ratio in excess of 4.5 from inexpensive raw materials.

Faujasite is a naturally occurring alumino-silicate. It has a characteristic X-ray structure. The synthetic materials designed "zeolite X" and "zeolite Y" by the Linde Division of Union Carbide Corporation are commonly referred to as synthetic faujasites. Zeolite Y is described in U.S. Patent 3,130,007 and is generally similar to zeolite X described in U.S. Patent 2,882,244. The chemical formula for zeolite Y given in U.S. Patent 3,130,007, is as follows: $0.9 \pm 0.2 Na_2O:Al_2O_3:wSiO_2:xH_2O$, wherein $w$ has a value of greater than 3 and up to about 6 and $x$ may have a value of as high as 9.

This phase of faujasite is distinguished from the type X zeolite by the silica-alumina ratio. The silica-alumina ratio affects the important physical properties of the faujasite. The synthetic faujasite having a silica-alumina molar ratio in excess of 4.5 is more thermally stable than the same material having a lower silica to alumina ratio. As a result, the high silica faujasite (type Y) is particularly useful as a catalyst ingredient or in certain selective absorption processes wherein the zeolite would be expected to encounter high temperatures during regeneration.

There are several prior art processes for preparing the high silica faujasite materials. The sodium form of the zeolite is prepared from dilute reactants and the reactants mass is filtered to remove the zeolite crystals from the mother liquor. The composition of the reaction mixture is varied depending on the source of silica that is used. Employing an aqueous colloidal silica sol or reactive amorphous silica, it is reported that a high silica form of zeolite Y can be obtained in the reaction mixture having a composition within the following range:

$Na_2/SiO_2$ _____ 0.4 to 6
$SiO_2/Al_2O_3$ _____ 15 to 25
$H_2O/Na_2O$ _____ 20 to 50

When sodium silicate, silica gels, or silicic acid are used, the preferred reaction mixture for preparing zeolite Y falls within the following range:

$Na_2O/SiO_2$ _____ 0.7 to 9
$SiO_2/Al_2O_3$ _____ 10 to 25
$H_2O/Na_2O$ _____ 12 to 90

It is apparent from these tables that the reaction mixtures have appreciably higher silica to alumina molar ratios than the zeolite products that are formed. This indicates that only a small part of the reactants are precipitated. The low yields, taken with the high cost of the reactants, especially the high cost of silica and alumina sources, account for the high cost of the synthetic faujasite product.

We have found a method of producing a zeolitic molecular sieve of the faujasite type from an inexpensive source of silica and alumina. In our process, we use clay to provide the alumina and a portion of the silica necessary to prepare our product.

In one embodiment, our process comprises preparing a reaction composition having essentially the same $SiO_2/Al_2O_3$ ratio as the final product. A quantity of zeolite nucleation sites (seeds) are added. This mixture is crystallized in a sodium silicate solution and the crystals separated and washed. The advantage of this particular embodiment is that a high silica faujasite can be prepared quantitatively from an inexpensive source of reactants.

U.S. Patent 3,391,994 describes a process for preparing a synthetic faujasite having a high silica to alumina ratio in which the silica to alumina ratio in the reactant mixture is maintained at 2. It is obvious that since the silica to alumina ratio in the product prepared by the process is greater than 4, the effective silica to alumina ratio in the clay had to be altered to achieve the proper result. This was accomplished by calcination at a temperature for a time such that "the clay is dehydrated and has undergone the characteristic kaolin exotherm at about 1800° F." The effect of this treatment is to deactivate a portion of the alumina in the clay and thus alter the silica-alumina ratio of the product. This process obviously results in a product of low purity.

Our process differs from the process covered in this patent in that by using our seeding technique, it is possible to prepare the synthetic faujasite with a high silica to alumina ratio from clay without the necessity of the high temperature calcination required in the patented process. In addition, we utilize essentially 100% of the reactants in our process. Our product is essentially a pure faujasite.

Copending patent application 738,116, filed June 19, 1968, describes a process for preparing crystalline alumino silicates using the "seeding" technique. The zeolite seeds are nucleation centers having an average size below about a tenth of a micron. As pointed out in this application, the seeding technique is advantageous in that it decreases the aging time necessary for formation of the zeolite. In the conventional processes, the reaction product is aged at varying temperatures for periods of from 1 to 4 days. Using the seeding technique, this aging time can be reduced to lower values, sometimes as low as 10 to 30 minutes. The present process differs from the process covered in this copending application in that the bulk of the silica and alumina are furnished by clay (such as kaolin clay) or some other inexpensive raw material, whereas the process covered in the application uses sodium aluminate or alumina and sodium silicate to provide the silica and alumina necessary for the preparation of the zeolite.

In the preferred embodiment, the first step of our process is the preparation of the precursor mixture. The desired quantity of metakaolin is weighed out and sufficient sodium silicate preferably commercial water glass is added. Metakaolin has the formula $Al_2O_3:2SiO_2$. The sodium silicate commercially available as water glass has the formula $Na_2O:3.2SiO_2:23.5H_2O$. It is apparent that the components in this reactant mixture are present in the same ratios as in the final zeolite $Na_2O:Al_2O_3:5.2SiO_2$.

It is generally desirable to prepare a product with the highest silica to alumina ratio possible. The silica to alumina ratio can be increased to a ratio of about 6 by increasing the amount of water glass added. It is obvious that a product with a lower silica to alumina ratio can be prepared by decreasing the amount of water glass solution. This would reduce the silica to alumina ratio of the reactant mixture and thus of the final product.

In the second step of the preparation, the zeolite seeds and reaction mixture are added to a previously prepared sodium silicate solution. An ideal source of this silicate solution is the filtrate from a previous synthesis. The zeolite seeds may also be added to the reactant mixture prepared in the first step of the process. The reactant mixture contains a weight of zeolite seeds equal to about 0.1 to about 10% of the product. The mixing procedure used in combining the seeds with the reaction mixture should be one which results in a rapid and thorough dispersion of the seeds throughout the mixture.

While seeds are normally added as from 0.1 to 10 weight percent (based on the weight of the final theoretical yield of the zeolite product), it should be understood, in excess of 10% by weight of zeolite seed crystals may be utilized to obtain similar results. However, amounts of seeds in excess of about 10% do not increase the rate of zeolite production in proportion to the economic value of the additional seed material. Likewise, less than 0.1 weight percent of the seeds may be used. However, the rate of reaction is very slow under these conditions.

The slurry of reactant mixture and seeds is heated in the sodium silicate solution at temperatures of about 60 to 110° C. until crystallization occurs, generally for a period ranging from 10 minutes to 30 hours. It has been found that during this reaction period, the desired crystalline zeolite forms, the yields which approach the theoretical yield expected from the starting materials present in the reactant mixture can be recovered. The reaction may be conducted at relatively uniform temperatures or if desired may be conducted at a series of different temperatures; that is, the slurry may be first aged at temperatures of from about 25 to 40° C. for a period of 2 minutes to 24 hours and subsequently heated to a higher temperature of from about 40 to 110° C. for a period of about 10 minutes or 30 hours. It is also to be understood that the reaction may be conducted where the temperature is continuously varied. Subsequent to the reaction, the resultant crystalline product is recovered by any convenient technique which may involve filtration of centrifugation. The recovered product is preferably washed to remove excess reactants and subsequently may be dried or used in the form of an aqueous slurry.

Our invention is further illustrated by the following specific but non-limiting examples.

EXAMPLE 1

Zeolite seeds were prepared by the following procedures:

(A) 29 g. of sodium aluminate ($Na_2O:Al_2O_3:3H_2O$) was dissolved in 368 g. of $H_2O$. A sodium silicate solution comprising 420 g. of sodium silicate (28.5% $SiO_2$; 8.7% $Na_2O$); 112 g. of NaOH and 100 g. of $H_2O$ was prepared. These solutions were cooled to 0° C., mixed and aged with stirring for 1 hour at 0° C. The mixture was then aged without stirring at 20° C. for 16 hours. The mixture was heated at 90 to 100° C. for 6 hours and the product was recovered by filtration and washed. The product possessed the crystalline structure of Type X zeolite and a silica to alumina ratio of about 2.5. The particle size of the product was between 0.01 and 0.05 micron. The nitrogen surface area was 720 m.$^2$/g.

(B) The procedure set forth in (A) above was repeated, however, the heating period at 90 to 100° C. was eliminated and the 20° C. aging period was reduced from 16 hours to about 4 hours. The resultant zeolite seed product possessed a particle size of below about 0.01 micron, a silica to alumina ratio of about 2.5, and no detectable crystallinity.

EXAMPLE 2

This example illustrates the method of preparing a high silica faujasite product.

A reactant mixture was prepared by mixing 66 g. of metakaolin and 213 g. of sodium silicate solution containing 28.5% $SiO_2$ and 8.7% $Na_2O$, the balance being water. The mixture was added to a solution of sodium silicate prepared by mixing 303 g. of sodium silicate containing 28.5% silica and 8.7% $Na_2O$, 44 g. of sodium hydroxide, and 405 g. of water. A total of 40 ml. of an amorphous zeolite seeding slurry prepared in accordance with the method described in Example 1(B) was added. The mixture was heated to 100° C. for a period of 15 hours. The product was separated by filtering and washed. The X-ray diffraction pattern showed a very high quality faujasite. The product had a surface area of 960 square meters per gram and a unit cell of 24.64 A. The silica-alumina ratio of the product was 4.62.

A sample of this faujasite was converted to catalytically active material by rare earth exchange. The catalyst demonstrated the exceptionally high activity and stability characteristics of a high silica faujasite containing catalyst.

EXAMPLE 3

This example illustrates the control of the silica-alumina ratio of the faujasite by controlling the composition of the crystallizing mixture.

Three separate samples were prepared using the same quantities of reactants as in Example 2. Each of the reactant mixtures contain 66 g. of kaolin and 213 g. of water glass. They were added to water glass solution containing excess NaOH. The first of these solutions contained 325 g. of water glass, 20 g. of sodium hydroxide, and 375 g. of water; the second, 350 g. of water glass, 20 g. of sodium hydroxide and 350 g. of water; and the third, 375 g. of water glass, 20 g. of sodium hydroxide, and 325 g. of water. The slurries were seeded with 40 ml. of an amorphous zeolite seeding mixture prepared in accordance with the method described in Example 1(B). The mixture was heated at 100° C. The first of the mixtures was heated for 18 hours; the second for 28 hours; and the third for 36 hours. The X-ray diffraction pattern in each case showed the product was a good faujasite material. The first product had a surface area of 945 square meters per gram; the second, 935 square meters per gram; and the third 945 square meters per gram. The silica to alumina ratio of the products were: 4.90, 5.58, and 5.90 respectively.

It is obvious from these data that the silica to alumina ratio of the final product is dependent on the composition of the solution in which the zeolite is crystallized as well as on the composition of the original reactant solution.

EXAMPLE 4

This example illustrates the method of preparing a faujasite having a higher silica to alumina ratio. A total of 66 g. of kaolin, and 238 g. of water glass were mixed together. The mixture was aged for a period of 24 hours and added to a solution containing 325 g. of water glass, 350 g. of water, and 20 g. of sodium hydroxide. A 40 ml. portion of an amorphous seed slurry prepared in accordance with the method described in Example 1(B) was added. The slurry was heated at 100° C. for a period of 100 hours, separated and washed. The product had a surface area of 900 square meters per gram and a silica to alumina ratio of 5.95.

Obviously, many modifications and variations of the invention may be made without departing from the essence and scope thereof and only such limitations should be applied as are indicated in the appended claims.

What is claimed is:

1 A process for preparing a crystalline zeolite aluminosilicate having the faujasite structure and a silica to alumina molar ratio above 4.5 which comprises:
  (a) Preparing an alkali metal silicate-kaolin reactant mixture having a silica to alumina ratio near to or the same as the desired zeolite product,
  (b) Adding said reactant mixture and about 0.1 to 10% based on the weight of the final product of amorphous aluminosilicate zeolitic nucleation centers having a particle size below about 0.1 micron, to an alkali metal silicate solution,
  (c) Heating the resulting slurry to a temperature of about 60 to 110° C. in said alkali metal silicate solution until crystallization of the zeolite is complete, and
  (d) Washing and recovering the zeolite product.

2. The process according to claim 1 wherein the alkali metal silicate is sodium silicate.

3. The process according to claim 1 wherein the crystallization period is from 10 minutes to about 100 hours.

4. A process for preparing a crystalline zeolite aluminosilicate having the faujasite structure and a silica to alumina ratio of greater than 4.5 which comprises:
  (a) Preparing a sodium silicate-metakaolin reactant mixture having a silica to alumina ratio near to or the same as the desired zeolite product.
  (b) Adding said reactant mixture and about 0.1 to 10 percent, based on the theoretical yield of the desired zeolite, of amorphous alumino-silicate zeolitic nucleation centers having a particle size of less than 0.1 micron, to a sodium silicate solution,
  (c) Heating said silicate solution to about 60 to 110° C. until crystallization of the zeolite is complete, and
  (d) Washing and recovering the zeolite product.

5. The process according to claim 1 wherein the crystallization period is from 10 minutes to 30 hours.

References Cited
UNITED STATES PATENTS

| | | | |
|---|---|---|---|
| 2,882,244 | 4/1959 | Milton | 23—113 |
| 3,119,659 | 1/1964 | Taggart et al. | 23—112 |
| 3,185,544 | 5/1965 | Maher | 23—112 |
| 3,321,272 | 5/1967 | Kerr | 23—113 |
| 3,433,589 | 3/1969 | Ciric et al. | 23—113 |
| 3,472,617 | 10/1969 | McDaniel et al. | 23—112 |

EDWARD J. MEROS, Primary Examiner

U.S. Cl. X.R.

252—455